US012676775B2

(12) United States Patent
Barbu et al.

(10) Patent No.: US 12,676,775 B2
(45) Date of Patent: Jul. 7, 2026

(54) PROCESSING REFERENCE SIGNAL ACROSS MULTIPLE SIGNAL CARRIERS

(71) Applicant: Nokia Technologies Oy, Espoo (FI)

(72) Inventors: Oana-Elena Barbu, Aalborg (DK);
Benny Vejlgaard, Aalborg (DK);
Johannes Harrebek, Aalborg (DK);
Ryan Keating, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 301 days.

(21) Appl. No.: 18/704,254

(22) PCT Filed: Oct. 27, 2021

(86) PCT No.: PCT/EP2021/079791
§ 371 (c)(1),
(2) Date: Apr. 24, 2024

(87) PCT Pub. No.: WO2023/072379
PCT Pub. Date: May 4, 2023

(65) Prior Publication Data
US 2026/0163764 A1 Jun. 11, 2026

(51) Int. Cl.
*H04L 25/02* (2006.01)
(52) U.S. Cl.
CPC ...... *H04L 25/0242* (2013.01); *H04L 25/0212* (2013.01)
(58) Field of Classification Search
CPC ... G01S 5/02; G01S 5/04; G01S 19/42; G01S 19/43; G06N 3/04; G06N 3/045;
(Continued)

(56) References Cited

U.S. PATENT DOCUMENTS

2014/0211779 A1* 7/2014 Caire ................ H04W 56/0015
370/350
2016/0223639 A1 8/2016 Davydov et al.
(Continued)

FOREIGN PATENT DOCUMENTS

CN 110022274 A 7/2019
CN 110677361 A 1/2020
(Continued)

OTHER PUBLICATIONS

"3rd Generation Partnership Project; Technical Specification Group Services and System Aspects; Service requirements for the 5G system; Stage 1 (Release 18)", 3GPP TS 22.261, V18.3.0, Jun. 2021, 91 pages.

(Continued)

*Primary Examiner* — Shawkat M Ali
(74) *Attorney, Agent, or Firm* — Nokia Technologies Oy

(57) ABSTRACT

A method, apparatus and computer program is described comprising: obtaining aggregated reference signals received from multiple signal carriers over channels of a mobile communication system, said signal carriers having different carrier frequencies; initialising: a first matrix, a channel power matrix and a noise estimate; and sequentially updating: a channel impulse response estimate, said channel power matrix and said noise estimate using mathematical maximisation; a second matrix; a vector of channel frequency offset; and the first matrix. The sequential updating is repeated until a termination condition reached.

20 Claims, 7 Drawing Sheets

(58) Field of Classification Search

CPC ........ H04B 7/02; H04B 7/0456; H04B 17/27; H04B 17/336; H04L 5/00; H04L 12/26; H04L 25/02; H04L 25/03; H04L 25/0212; H04L 25/0242; H04L 27/00; H04L 27/26; H04W 4/02; H04W 24/10; H04W 56/00; H04W 64/00; H04W 72/08; H04W 88/02

USPC ........ 370/328, 336; 375/219, 260, 262, 267, 375/295, 316, 346

See application file for complete search history.

(56) References Cited

U.S. PATENT DOCUMENTS

| 2016/0337105 A1* | 11/2016 | Lawton | ................. H04L 5/0057 |
| 2020/0267681 A1 | 8/2020 | Ferrari et al. | |
| 2021/0109234 A1 | 4/2021 | Kassas et al. | |

FOREIGN PATENT DOCUMENTS

| WO | 2019/034252 A1 | 2/2019 | |
| WO | 2020/069083 A1 | 4/2020 | |
| WO | 2020/091686 A1 | 5/2020 | |
| WO | WO-2021184198 A1 * | 9/2021 | ............. H04L 27/26 |

OTHER PUBLICATIONS

"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.

"3rd Generation Partnership Project; Technical Specification Group Radio Access Network; NR; Physical layer procedures for data (Release 16)", 3GPP TS 38.214, V16.6.0, Jun. 2021, pp. 1-172.

"New WID on NR Positioning Enhancements", 3GPP TSG RAN Meeting #90e, RP-202900, Agenda: 9.1.1, CATT, Dec. 7-11, 2020, 5 pages.

"3rd Generation Partnership Project; Technical Specification Group Radio Access Network; Study on NR Positioning Enhancements; (Release 17)", 3GPP TR 38.857, V17.0.0, Mar. 2021, 545 pages.

Efatmaneshnik et al., "A Fast Multidimensional Scaling Filter for Vehicular Cooperative Positioning", Journal of Navigation, vol. 65, No. 02, Apr. 2012, pp. 1-25.

"3rd Generation Partnership Project; Technical Specification Group Radio Access Network; NR; Physical layer measurements (Release 16)", 3GPP TS 38.215, V16.4.0, Dec. 2020, pp. 1-25.

Noschese et al., "Multi-Band Time of Arrival Estimation for Long Term Evolution (LTE) Signals", IEEE Transactions on Mobile Computing, vol. 20, No. 12, Dec. 1, 2021, 12 pages.

International Search Report and Written Opinion received for corresponding Patent Cooperation Treaty Application No. PCT/EP2021/079791, dated Jul. 21, 2022, 12 pages.

* cited by examiner

PROCESSING REFERENCE SIGNAL ACROSS MULTIPLE SIGNAL CARRIERS

RELATED APPLICATION

This application claims priority to the PCT application number PCT/EP2021/079791, filed on Oct. 27, 2021, the content of which is incorporated herein by reference in its entirety.

FIELD

Embodiments as set out in this document relate to processing reference signal across multiple signal carriers of a mobile communication system.

BACKGROUND

Reference signals, such as positioning signals, transmitted across multiple carriers of a mobile communication system can be processed, for example as part of a positioning algorithm. There remains a need for further developments in this field.

SUMMARY

In a first aspect, this specification describes an apparatus comprising means for performing: obtaining aggregated reference signals received from multiple signal carriers over channels of a mobile communication system, said signal carriers having different carrier frequencies; initialising: a first matrix, a channel power matrix and a noise estimate, wherein the first matrix models (e.g. shows or explains) how carrier frequency offset of said channel rotates reference signal phase; sequentially updating: a channel impulse response estimate, said channel power matrix and said noise estimate (e.g. using mathematical maximisation); a second matrix, wherein the second matrix describes how reference signals transmitted over the channel are spread and delayed due to multipath propagation; a vector of channel frequency offset; and the first matrix; and repeating said sequential updating until a termination condition reached. The said reference signals may comprise position reference signals, sounding reference signals or synchronization signals.

Some example embodiments further comprise means for performing: generating a position estimate based on at least one of said estimated channel impulse response and said carrier frequency offset estimate. For example, the position estimate may be based on both the estimated channel impulse response (CIR) and the carrier frequency offset (CFO) estimate.

The means for performing updating said channel impulse response may assume that said channel impulse response is sparse and/or has a constant delay profile across carriers. This may, for example, apply to the inter band case. For intra-band, the same carrier frequency offset may be set for all carriers.

In some example embodiments, the second matrix is updated based, at least in part, using the updated channel impulse response estimate.

The vector of channel frequency offset may be updated based, at least in part, on the updated second matrix and on power and noise estimates. Alternatively, or in addition, the first matrix may be updated based, at least in part, on the updated vector of channel frequency offset.

In some example embodiments, the updated first matrix is used in updating of the channel impulse response estimate on a next iteration of the sequential updating.

The means for performing obtaining said aggregated reference signals may comprise means for performing: receiving said reference signals transmitted on carriers over the channel of said mobile communication system; and aggregating the received reference signals.

The said signal carriers may comprise intra-band carriers and/or inter-band carriers. The means for performing updating said carrier frequency offset estimate may assume that carrier frequency offsets across carriers are independent.

In some example embodiments, the signal carriers have contiguous frequencies.

The means may comprise: at least one processor; and at least one memory including computer program code, the at least one memory and computer program code configured to, with the at least one processor, cause the performance of the apparatus.

In a second aspect, this specification describes a method comprising: obtaining aggregated reference signals (e.g. PRS, SRS or synchronisation signals) received from multiple signal carriers over channels of a mobile communication system, said signal carriers having different carrier frequencies; initialising: a first matrix, a channel power matrix and a noise estimate, wherein the first matrix models (e.g. shows or explains) how carrier frequency offset of said channel rotates reference signal phase; sequentially updating: a channel impulse response estimate, said channel power matrix and said noise estimate (e.g. using mathematical maximisation); a second matrix, wherein the second matrix describes how reference signals transmitted over the channel are spread and delayed due to multipath propagation; a vector of channel frequency offset; and the first matrix; and repeating said sequential updating until a termination condition reached.

Some example embodiments further comprise: generating a position estimate based on at least one of said estimated channel impulse response and said carrier frequency offset estimate. For example, the position estimate may be based on both the estimated channel impulse response (CIR) and the carrier frequency offset (CFO) estimate.

Updating said channel impulse response may assume that said channel impulse response is sparse and/or has a constant delay profile across carriers. This may, for example, apply to the inter band case. For intra-band, the same carrier frequency offset may be set for all carriers.

In some example embodiments, the second matrix is updated based, at least in part, using the updated channel impulse response estimate.

The vector of channel frequency offset may be updated based, at least in part, on the updated second matrix and on power and noise estimates. Alternatively, or in addition, the first matrix may be updated based, at least in part, on the updated vector of channel frequency offset.

In some example embodiments, the updated first matrix is used in updating of the channel impulse response estimate on a next iteration of the sequential updating.

Obtaining said aggregated reference signals may comprise: receiving said reference signals transmitted on carriers over the channel of said mobile communication system; and aggregating the received reference signals.

The said signal carriers may comprise intra-band carriers and/or inter-band carriers. The means for performing updating said carrier frequency offset estimate may assume that carrier frequency offsets across carriers are independent.

In some example embodiments, the signal carriers have contiguous frequencies.

In a third aspect, this specification describes computer-readable instructions which, when executed by a computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: obtaining aggregated reference signals (e.g. PRS, SRS or synchronisation signals) received from multiple signal carriers over channels of a mobile communication system, said signal carriers having different carrier frequencies; initialising: a first matrix, a channel power matrix and a noise estimate, wherein the first matrix models (e.g. shows or explains) how carrier frequency offset of said channel rotates reference signal phase; and sequentially updating: a channel impulse response estimate, said channel power matrix and said noise estimate (e.g. using mathematical maximisation); a second matrix, wherein the second matrix describes how reference signals transmitted over the channel are spread and delayed due to multipath propagation; a vector of channel frequency offset; and the first matrix; and repeating said sequential updating until a termination condition reached.

In an seventh aspect, this specification describes an apparatus comprising a receiver (or some other means) for obtaining aggregated reference signals (e.g. PRS, SRS or synchronisation signals) received from multiple signal carriers over channels of a mobile communication system, said signal carriers having different carrier frequencies; a control module (or some other means) for initialising: a first matrix, a channel power matrix and a noise estimate, wherein the first matrix models (e.g. shows or explains) how carrier frequency offset of said channel rotates reference signal phase; a processor (or some other means) for sequentially updating: a channel impulse response estimate, said channel power matrix and said noise estimate (e.g. using mathematical maximisation); a second matrix, wherein the second matrix describes how reference signals transmitted over the channel are spread and delayed due to multipath propagation; a vector of channel frequency offset; and the first matrix; and the control module (or some other means) for repeating said sequential updating until a termination condition reached.

BRIEF DESCRIPTION OF DRAWINGS

Example embodiments will now be described, by way of non-limiting examples, with reference to the following schematic drawings, in which.

DETAILED DESCRIPTION

Figure 1:
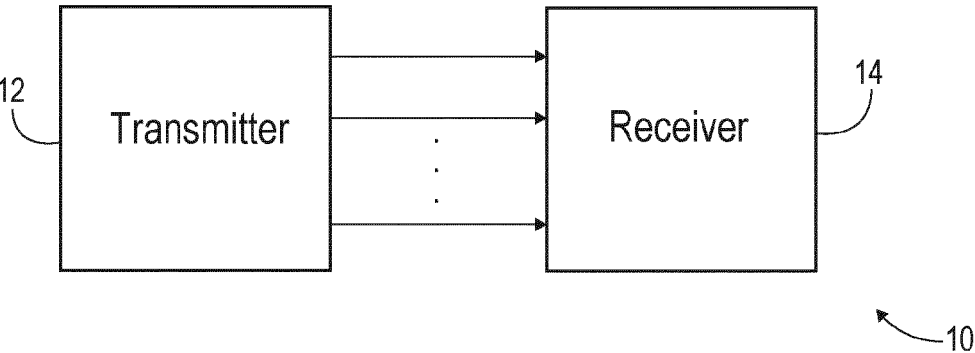
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a transmitter 12 and a receiver 14. The transmitter 12 may be a node of a mobile communication system (e.g. a gNB or base station) and the receiver may be a user device or user equipment of that mobile communication system (a downlink scenario). Alternatively, the transmitter 12 may be a user device of a mobile communication system and the receiver a node of that mobile communication system (an uplink scenario).

A plurality of signals are sent from the transmitter 12 to the receiver 14. The signals are transmitted using multiple signal carriers, having different carrier frequencies, such that the system 10 is operating in a carrier aggregation (CA) mode. The signal carriers may comprise intra-band carriers (where the frequencies of the different carriers are within the same frequency band) or intra-band carriers (where the frequencies of the different carriers are in different bands).

The intra-band scenario may comprise simultaneous transmission by the transmitter 12 and aggregated reception by the receiver 14 of one or more contiguous carriers in one or more contiguous positioning frequency layers (PFLs). The inter-band scenario may comprise simultaneous transmission by the transmitter 12 and aggregated reception by the receiver 14 of multiple contiguous intra-band carriers.

As discussed in detail below, the transmitter signals may comprise positioning signals (such as positioning reference signals in the downlink scenario or sounding reference signals in the uplink scenario). The signals may be used in the generation of a position estimate of a user device. For example, the system 10 may use a time-of-arrival (TOA)-based positioning algorithm in which the time of arrival of signals transmitted from the transmitter 12 to the receiver 4 over the multiple single carriers are used for position estimation, for example at the receiver 4.

One challenge in the use of a transmitted reference signals (such as positioning reference signals) for accurately estimating the position of a user device in a mobile positioning accuracy is the limited bandwidth that is typically available. For example, in known time-of-arrival (TOA)-based position estimation system, higher signal-to-noise ratio (SNR) and wide bandwidth generally lead to more accurate positioning. Furthermore, carrier frequency offset (CFO) is one of many non-ideal conditions that may affect a baseband receiver design and the TOA acquisition since the receiver may include the CFO in the channel impulse response (CIR) estimation.

CFO is a mismatch between the transmit carrier frequency, called $f_{TX}$ and received carrier frequency $f_{RX}$, as seen by a receiver (such as the receiver 14). The mismatch, i.e. CFO ($f_{TX}-f_{RX}$) can be caused by imperfect oscillators at the transmitter or receiver sides and/or by Doppler effects. CFO introduces intercarrier interference when demodulating the received signal. In the time domain, the CFO effect appears as an amplitude reduction and phase shift of any given multipath component.

CFO mismatch can be further complicated in systems (such as the system 10) that are operating in a carrier aggregation (CA) mode, since different carriers may behave differently and may, for example, experience different carrier frequency offsets (CFOs).

Figure 2:
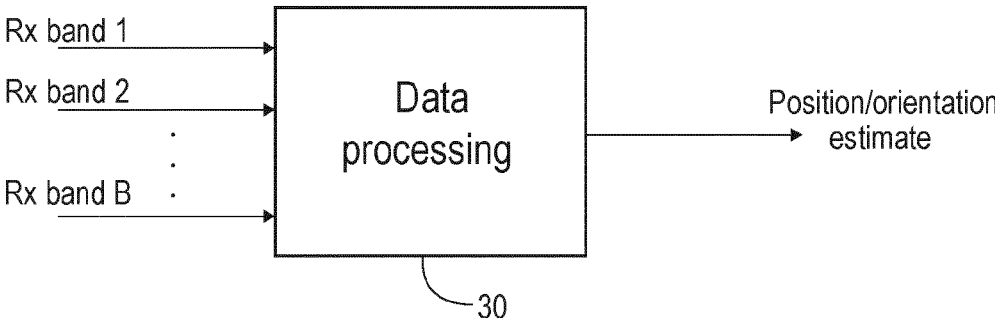
FIG. 2 is a block diagram of a system in accordance with an example embodiment.

FIG. 2 is a block diagram of a data processing system 30 in accordance with an example embodiment. The system 30 obtains aggregated reference signals received from multiple signal carriers over channels of a mobile communication system and uses the aggregated reference signals in the generation of a position and/or an orientation estimate of a user device. As in the system 10, the signal carriers of the system 30 have different carrier frequencies and form part of a carrier aggregation (CA) system. The system 30 may, for example, form part of the receiver 14 of the system 10 described above.

Figure 3:
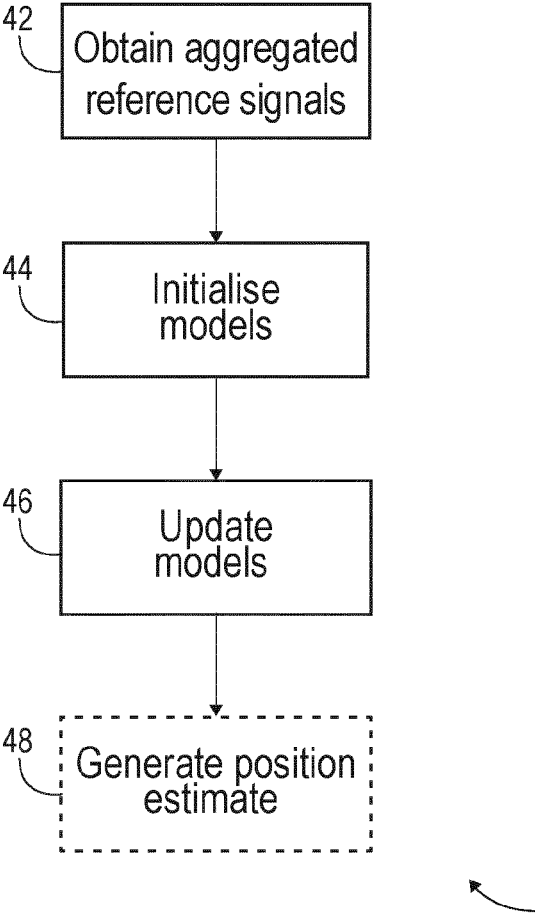
FIGS. 3 to 5 are flow charts showing algorithms or methods in accordance with example embodiments.

FIG. 3 is a flow chart showing a method or algorithm, indicated generally by the reference numeral 40, in accordance with an example embodiment. The method or algorithm 40 may be implemented by the data processing system 30.

The algorithm 40 starts at operation 42, where aggregated reference signals from multiple signal carriers over channels of a mobile communication system are obtained. The reference signals are transmitted over channels of the mobile communication system and are aggregated, for example at the relevant receiver. The signal carriers have different carrier frequencies and, as discussed above, may comprise intra-band carriers or inter-band carriers. The reference signals may take many forms, such as position reference signals (PRS), sounding reference signals (SRS) or synchronization signals.

At operation 44, a number of models are initialised. As discussed in detail below, the models may include a first matrix (that models how carrier frequency offset of said channel rotates reference signal phase), a channel power matrix and a noise estimate.

At operation 46, a number of models are updated. These models include those initialised in the operation 44 and may also include an estimated channel impulse response and a carrier frequency offset estimate. The models are updated sequentially until a termination condition is reached.

If a position (or orientation) estimate is required, then, at operation 48, a position (or orientation) estimate is generated based on the estimated channel impulse response and/or the carrier frequency offset estimate generated in the operation 46.

Figure 4:
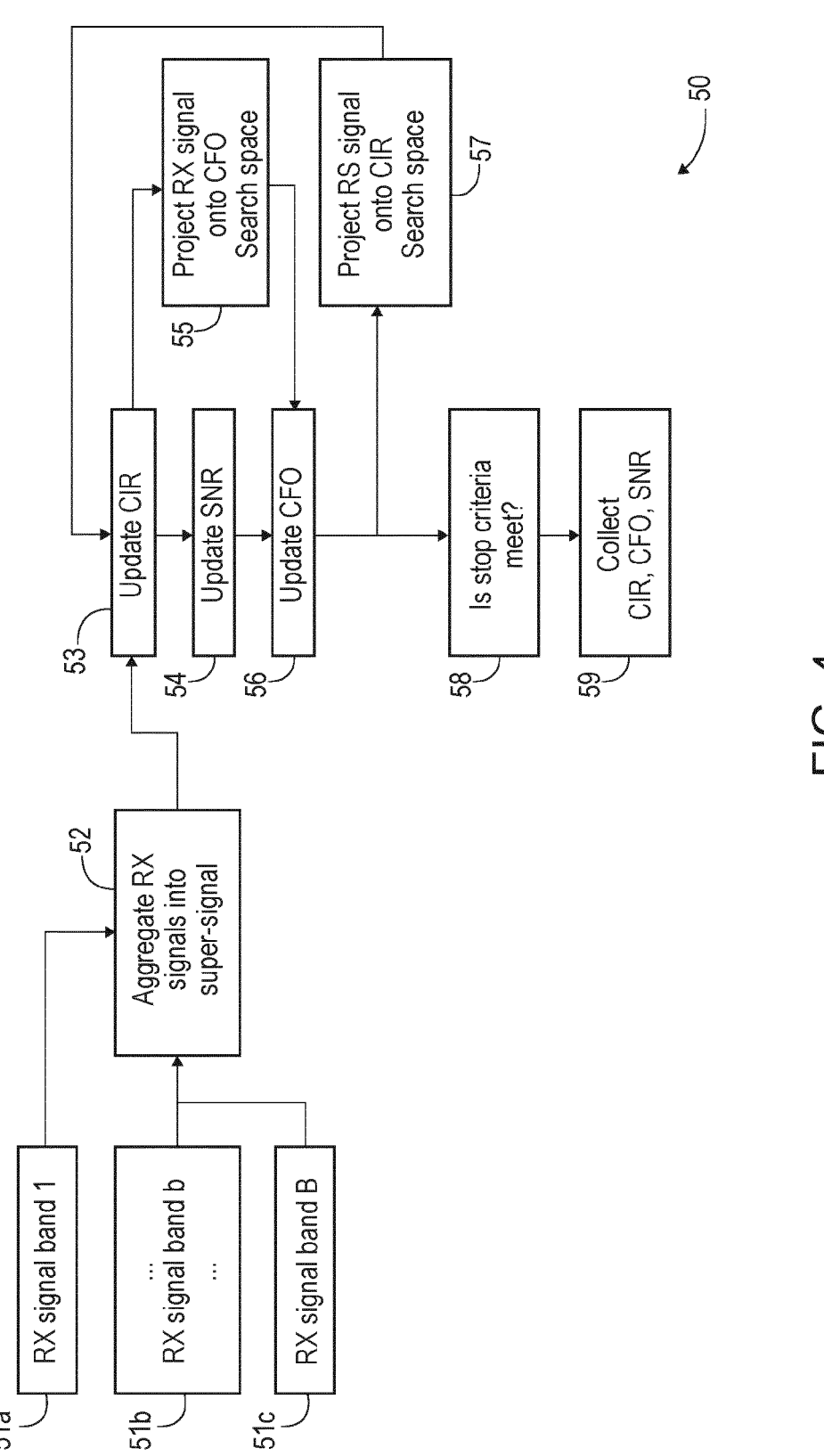

FIG. 4 is a flow chart showing a method or algorithm, indicated generally by the reference numeral 50, in accordance with an example embodiment. The method or algorithm 50 may be implemented by the data processing system 30 described above and is an example implementation of the algorithm 40 described above.

The algorithm 50 can be used as a localization method through which a carrier aggregation (CA)-based user device obtains estimates of the channel impulse response (CIR) and of the band-dependent carrier frequency offsets (CFO) by jointly processing reference signals (e.g. positioning reference signals) sent across multiple carriers. Note that the method treats the CFO across carriers as independent and identically distributed and applies to both intra- and inter-band CA systems.

The algorithm 50 makes use of a number of models.

A first model maps the aggregated time-domain reference signal (e.g. PRS) to the wireless channel via the implementation of several RX operations. These include a first projection operation that models how transmit signal samples are spread and delayed over the received signal due to multipath propagation and a second projection operation that models by how much the carrier dependent CFO rotates the phase of each received PRS sample.

A second model aggregates the reference signals received across bands in a unified signal model in which the channel is isolated from the CFO and noise effects. The model is used to estimate the CIR, since it enables a closed form expression of the former quantity. The CIR is modelled as a finely sampled version of the true CIR in the delay domain, where the delay resolution is a modelling choice, and hence independent of the system sample time, i.e. both carrier- and bandwidth-independent.

An alternative (and mathematically equivalent) expression of the second model described above aggregates the reference signals so that the CFO contribution is isolated from all other effects. This model is realized per band and assumes that the CFOs are independent and identically distributed (i.i.d) across bands. The model can be used to estimate the CFO for each band, independent of each other, using the recently estimated CIR.

The algorithm 50 uses the models describes above to jointly estimate CIR and CFO by additional assuming that the CIR is sparse within a carrier (e.g. has only a few channel taps) and exhibits the same delay profile across carriers and that the CFOs across carriers are independent.

At operations 51a to 51c of the algorithm 50, reference signals transmitted on carriers over channels of a mobile communication system are received. Those signals are aggregated in operation 52. The operations 51 and 52 of the algorithm 50 are therefore an example implementation of the operation 42 described above.

A positioning transmitter (e.g. a transmission-reception point (TRP) in a downlink scenario or a user device/equipment in an uplink scenario) uses b=1: B bands to transmit a positioning signal $u_b(t)$ on each band. This signal is passed through a bandpass filter with response and upconverted to the carrier frequency $f_{c,b}$.

As discussed above, the signal carriers may comprises intra-band carriers or inter-band carriers.

In the intra-band case, the B transmit signals $v_b(t)=(u_b)$ exp ($j2\pi f_{c,b}t$) travel over a wireless channel with impulse response $h(t)=\Sigma_{l=1:K}\alpha_l\delta(t-\tau_l)$ consisting of l=1:L multipath components, each characterized by a complex gain $\alpha_l$ and a delay $\tau_l$, where for simplicity we assume that the delay vector $\tau=[\tau_1, \ldots \tau_L]$, is ordered in ascending order. We may assume, in the intra-band scenario, that the bands are close enough in frequency so that the CIR variation with carrier change is negligible.

At reception, after imperfect down-conversion from carrier $f_{c,b}$ i.e. $v_b(t)exp(-j(2\pi(f_{c,b}+\xi)t))$, and bandpass filtering, the b-th received signal is $y_b(t)=(\overline{h}*u_b)(t)+\in(t)$, b=1:B, where the CIR$\overline{h}(t)=h$ exp($j2\pi\xi t$), $\xi$ being the carrier frequency offset (CFO).

In the inter-band case, an additional effect appears in the received signal. Specifically, the down-conversion introduces a random CFO $\xi_b$ at each carrier, so that the received signal in band b becomes $y_b(t)=(\overline{h_b}*u_b)(t)+\in(t)$, b=1:B, where the CIR $\overline{h_b(t)}=h \exp(j2\pi\xi_b t)$, and the CFOs $\xi_b$, $\forall b=1$: B, across carriers are independent and identically distributed.

In the operation 53, the reference signals received across bands are aggregated in a unified signal model in which the channel is isolated from the CFO and noise effects (as discussed in detail below). The model is used to update an estimate of the CIR, since the model enables a closed form expression of the former quantity. The CIR is modelled as a finely sampled version of the true CIR in a delay domain, where the delay resolution is a modelling choice, and hence independent of the system sample time (i.e. both carrier- and bandwidth-independent).

At operation 54, a signal-to-noise ratio is updated.

At operation 55, the received signal is projected onto the CFO space, as discussed further below.

At operation 56, a matrix describing the CFO is updated, based on the outputs of the operations 53 to 55 described above. The operation 56 uses the model described above in which CFO contribution is isolated from all other effects. This model is realized per band and assumes that the CFOs are independent and identically distributed (i.i.d) across bands. The model will be used to estimate the CFO for each band, independent of each other, using the recently estimated CIR.

Based on the CFO update, the received signals are projected onto the CIR search space in operation 57, which can be used to further update the CIR, if required.

At operation 58, a determination is made regarding whether a stop/termination condition has been reached. If not, the operations 53 to 57 are repeated (thereby iteratively updating the various models). Otherwise, the algorithm terminates at operation 59, where CIR, CFO and SNR estimates are provided. These can be used in positioning and/or orientation estimation algorithms (e.g. in the operation 48 described above). The stop/termination condition may take many forms, such as a predefined number of iterations and/or a defined quality metric (e.g. a determination that the outputs of the modelling processing has not changed significantly in the previous iteration).

In the following mathematical description of the system 50, we use the more generic inter-band signal model, since the intra-band model is a particular implementation of the former where $\xi_b=\xi, \forall b \in 1:B$.

The reference signal aggregated in the operation 52 is sampled at a rate $T_s(b)$ dependent on the band b, to yield the samples $y_b[n]=y_b(nT_s)$, n=0:N−1.

Next, we collect the received samples $y_b=[y_b[1], \ldots, y_b[N]]^T$ and cast the approximate model $y_b=\Phi_b U_b h+\in_b$, where:

the CFO matrix is diagonal and defined as $$\Phi_b = \begin{bmatrix} \exp(j\ v_b 0) & \ldots & 0 \\ \vdots & \ddots & \vdots \\ 0 & \ldots & \exp(j\ v_b(N-1)) \end{bmatrix}.$$

the normalized CFO (n-CFO) is $v_b=2\pi\xi_b T_s(b)$.

the TX signal matrix is defined as $U_b \in R^{N \times K}$, $U_b(n,k)=u_b((nT_s(b)-k\delta\tau))$.

The channel h is an approximation of the true channel, the former being a delay-discretized version of the latter;

specifically, we redefine the approximate CIR with delays on a grid of selected fine resolution, i.e. $\delta\tau \leq \min\{T_s(1), \ldots, T_s(B)\}$.

The received samples are cross-correlated with the known transmit sequence $u_b=[u_b[1], \ldots, u_b[N]]^T$ to yield $z_b=y_b*u_b$, where $*$ denotes a linear operation, e.g. cross-correlation, with d-th entry approximated to $$z_b(dT_s(b)) = z_b[d] =$$

$$\sum_{n=d}^{d+N-1} y_b[n]u_b[n-d] \approx \sum_{k=1}^{K} \overline{h}_b[k]\gamma_b\left(\left(d - k\frac{\delta\tau}{T_s(b)}\right)T_s(b)\right) + \xi_b[d],$$

where $\gamma_b$ is the ACF of the transmit sequence $u_b$.

Re-writing in matrix-vector notation, $tz_b$ becomes $z_b=V_b h+\xi_b$, $\forall b$, where the matrices:

$$\Gamma_b \in R^{N \times K}, \Gamma_b(n, k) = \gamma_b(dT_s(b) - k\delta\tau) \qquad (6.1)$$

$$V_b = \Phi_b \Gamma_b$$

We collect the resulting observations from all carriers in the vector $$z = [z_1^T, \ldots, z_B^T]^T$$

and isolate the CIR (see the operation 53 of the algorithm 50):

$$z = Vh + \xi, \qquad (7)$$

$$V = \begin{bmatrix} V_1 \\ V_2 \\ \ldots \\ V_B \end{bmatrix} = \begin{bmatrix} \Phi_1\Gamma_1 \\ \ldots \\ \Phi_N\Gamma_N \end{bmatrix} \qquad (7.1)$$

The equations above collect the contributions of n-CFO and TX signal at each band. To isolate the band dependent n-CFO, we write the equivalent expression at band b as:

$$z_b = A_b\phi_b + \epsilon \qquad (8)$$

Where:

$$A_b = \begin{bmatrix} a_b(1) & \ldots & 0 \\ \vdots & \ddots & \vdots \\ 0 & \ldots & a_b(N) \end{bmatrix}, a_b = U_b h. \qquad (8.1)$$

$$\phi_b = [\exp(j\ v_b 0) \ldots \exp(j\ v_b(N-1))]^T. \qquad (8.2)$$

Next, we formulate the optimization problem of jointly estimating the CIR h using the Equation (7) and of estimating n-CFO per band, using Equation (8), by assuming the CFO across bands are independent and identically distributed and that CIR is sparse in delay domain:

$$\hat{h}, \hat{v}, \ \hat{\lambda} = \arg\max p(h, v, \lambda|z) = \arg\max\ p(z|h, v, \lambda)p(h)p(v)p(\lambda) \qquad (9)$$

where the n-CFO vector collects the CFO of all bands: $v=[v_1 \ldots v_B]^T$ and $\lambda$ is the noise precision (i.e. SNR), i.e. $\in \rightarrow CN(0, \lambda^{-1}I)$.

We solve the Equation (9) and use this solution to generate CIR, noise and CFO estimates in the operations 53 to 55 of the algorithm 50. To solve Equation (9), we pose the following prior probability density functions (pdfs):

- A sparsity inducing prior for $h$: $p(h, g) = p(h|g)p(g)$, $p(h|g) = CN(0, G)$, $G =$ $$\text{diag}\{g\}, \ p(g) = \prod_{l=1}^{K} Ga(2, 1);$$

- A uniform prior in $[0, 2\pi]$ for CFO $p(v) = \prod_{b=1}^{B} p(v_b)$, $$p(v_b) = U(0, 2\pi).$$

- An improper prior for noise precision $p(\lambda) = \dfrac{1}{\lambda}$.

Once the algorithm 50 is complete (i.e. the termination condition has been reached), a user device position estimate may be generated based on the channel impulse response and/or the carrier frequency offset estimate estimated using the algorithm 50.

Figure 5:
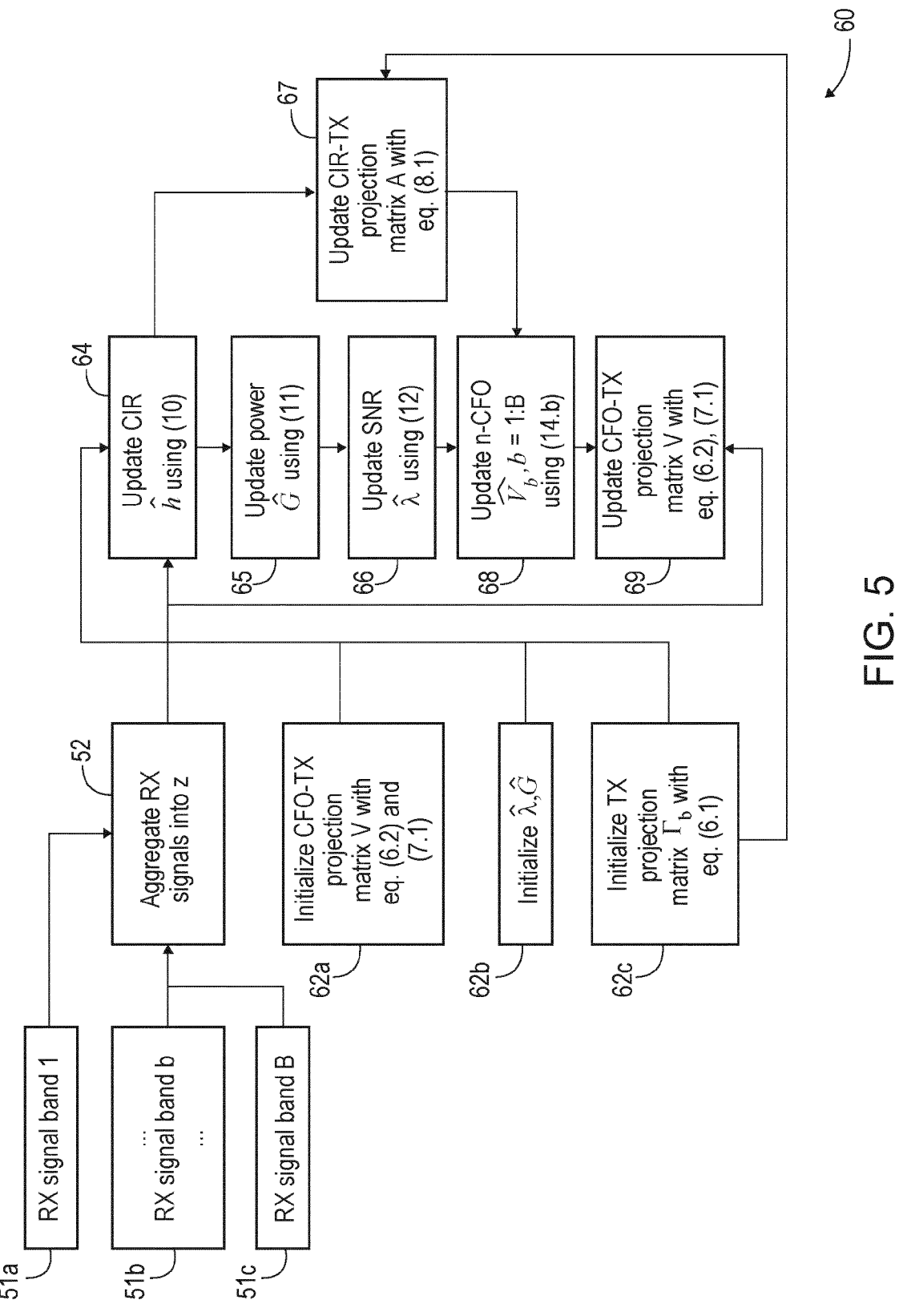

FIG. 5 is a flow chart showing a method or algorithm, indicated generally by the reference numeral 60, in accordance with an example embodiment. The method or algorithm 60 may be implemented by the data processing system 30 described above and is an example implementation of the algorithm 40 described above.

The algorithm 60 includes the operations 51a to 51c of the algorithm 50 described above in which reference signals transmitted on carriers over channels of a mobile communication system are received. Those signals are aggregated in operation 52.

The algorithm 60 also includes a number of initialisation modules 62a, 62b and 62c. The modules 62a to 62c initialize: a covariance matrix $\Sigma$, SNR $\hat{\lambda}$, n-CFO matrix V, channel power matrix $\hat{G}$. Various initializations may be used, e.g. $\Sigma = \hat{G} = V = 1$, $\hat{\lambda} = 1$.

In the operations 64 to 66, various parameters are updated sequentially until a termination condition is reached. Specifically, the channel impulse response estimate $\hat{h}$ is updated in the operation 64, the estimated channel power matrix $\hat{G}$ is updated in operation 65 and the SNR $\hat{\lambda}$ is updated in the operation 66, for example using the following equations:

$$\hat{h} = \hat{\lambda} \sum V^H z \tag{10}$$

$$\sum = \left( \hat{\lambda} V^H V + \hat{G}^{-1} \right)^{-1} \tag{11.a}$$

$$\hat{g}_l = \sqrt{\left( \hat{h}_l^2 + \sum_{l,l} \right)} \tag{11.b}$$

$$\hat{\lambda} = \frac{NB}{\|z - V\hat{h}\|_2^2} \tag{12}$$

As discussed above, updating the channel impulse response may including assuming that said channel impulse response is sparse and/or has a constant delay profile across carriers.

In the operation 67, the matrix $A_b$ (which describes all channel effects, other than CFO) is updated, using the Equation (8.1) described above:

$$A_b = \begin{bmatrix} a_b(1) & \ldots & 0 \\ \vdots & \ddots & \vdots \\ 0 & \ldots & a_b(N) \end{bmatrix}, a_b = U_b h. \tag{8.1}$$

For n-CFO estimation, we assume the n-CFO are independent and identically distributed and we update the n-CFO vector by independently updating each of the entries. Here, we may perform a grid search, by assuming the offset angles are uniformly distributed in $[0, 2\pi]$ and using the dual model derived in eq. (8):

$$\hat{v_b} = \arg \max p(z_b|v_b)p\left(v_b = \arg \max CN\left(z_b \Big| A_b \phi_b, \hat{\lambda}^{-1}I\right)U[0, 2\pi], \forall b \tag{13}$$

$$= 1 : B$$

Where the column vector $\phi_b$ is defined in Equation (8.2) described above:

$$\phi_b = [\exp(j v_b 0) \ldots \exp(j v_b(N-1))]^T. \tag{8.2}$$

Expanding Equation (13) and dropping the constants, we rewrite the problem as:

$$\hat{v_b} = \arg \max_{v_b \in 0, 2\pi} \exp\left(-\lambda\left[-2\text{Re}\{A_b^H \phi_b\} + \phi_b^H A_b^H A_b \phi_b\right]\right), \forall b = 1 : B \tag{14}$$

To avoid numerical imbalances due to working with small numbers, we reformulate Equation (14) as $$\hat{v_b} = \arg \max_{v_b \in [0, 2\pi]} \ln \exp(f(v_b)),$$

where we define the function $$f(v_b) = -\hat{\lambda}\left[-2\text{Re}\{z_b^H A_b \phi_b\} + \phi_b^H A_b^H A_b \phi_b\right], \tag{14.a}$$

$$\phi_b = [\exp(j v_b 0) \ldots \exp(j v_b(N-1))]^T$$

and recast Equation (14) as:

$$\hat{v_b} = \arg \max_{v_b \in [0, 2\pi]} f(v_b), \forall b = 1 : B \tag{14.b}$$

Equation (14.b) may be solved for each b=1:B using the method of Lagrange multipliers, an exhaustive grid search in $[0, 2\pi]$ with selected resolution, or any other solver of choice.

Lastly, the conversion from n-CFO to CFO can be implemented as follows:

$$\hat{\xi}_b = \frac{\hat{v_b}}{2\pi T_s(b)} \tag{15}$$

Note that for intra-band transmissions, the n-CFO vector becomes a scalar and the problem simplifies to the one of computing $\hat{v}$ in the model:

$$z = A\phi + \epsilon \qquad (16)$$

Where:

$A_b$ is defined in Equation (8.1), z is defined in Equation (7), the vector $\phi=[\exp(j\ v0) \ldots \exp(j\ v(N-1))]^T$, and $$A = \begin{bmatrix} A_1 \\ \ldots \\ A_B \end{bmatrix}.$$

The problem is dual to the one (14.b), where the indexing b is dropped:

$$f(v) = -\hat{\lambda}\left[-2\mathrm{Re}\{z^H A\phi\} + \phi A^H A\phi^H\right] \text{ and:} \qquad (17)$$

$$\hat{v} = \arg\max_{v\in[0,2\pi]} f(v), \forall b = 1{:}B$$

In operation 69, the matrix V is updated using the Equation (7.1) and the updated values in the current iteration of the models, as outlined above, where:

$$V = \begin{bmatrix} V_1 \\ V_2 \\ \ldots \\ V_B \end{bmatrix} = \begin{bmatrix} \Phi_1\Gamma_1 \\ \ldots \\ \Phi_N\Gamma_N \end{bmatrix} \qquad (7.1)$$

The operations 64 to 69 are repeated until a stop/termination criteria is reached. The stop/termination condition may take many forms, such as a predefined number of iterations and/or a defined quality metric (e.g. a determination that the outputs of the modelling processing has not changed significantly in the previous iteration).

Once the algorithm 60 is complete (i.e. the termination condition has been reached), a user device position estimate may be generated based on the channel impulse response and/or the carrier frequency offset estimate estimated using the algorithm 60.

Figure 6:
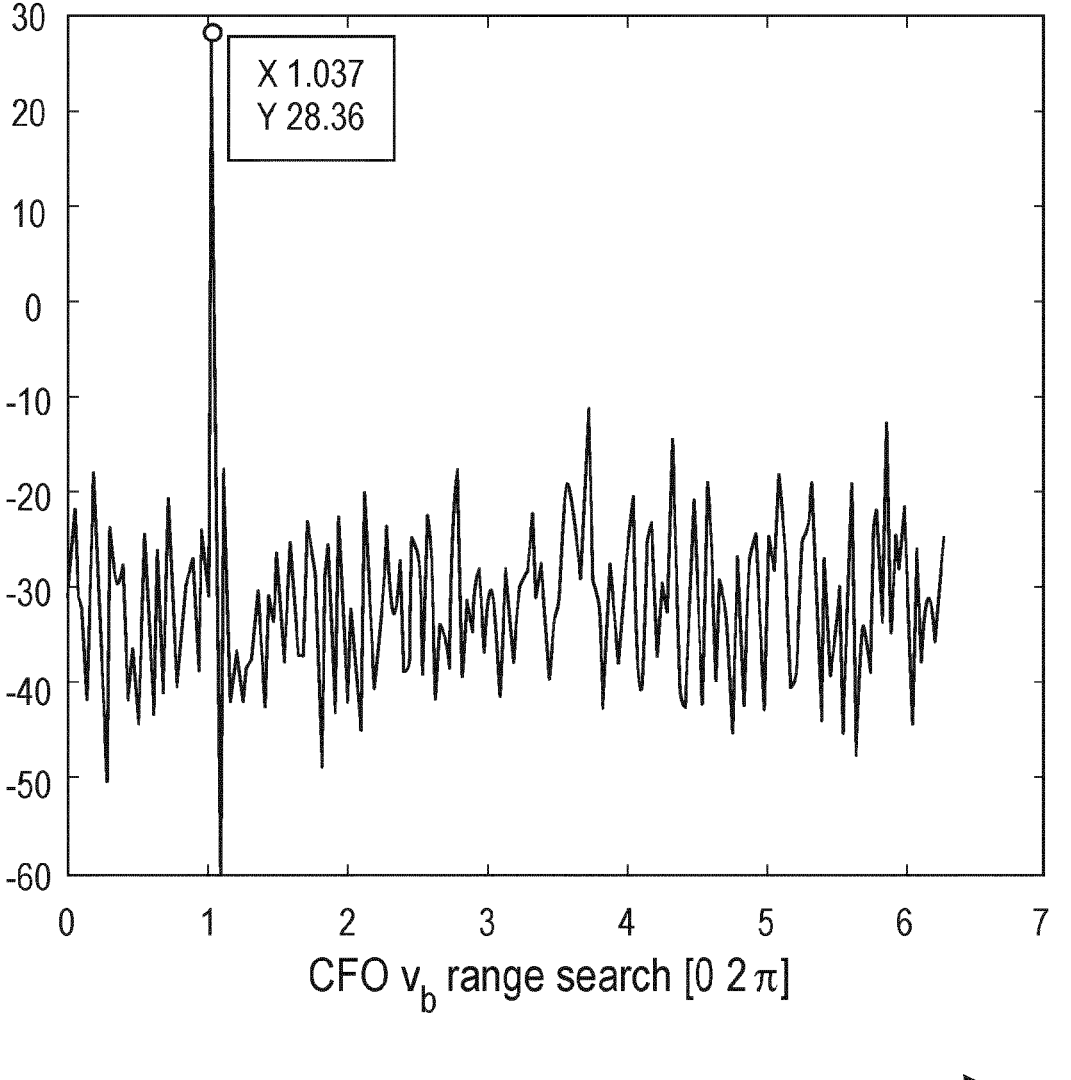
FIGS. 6 and 7 are plots showing simulations in accordance with example embodiments.
Figure 7:
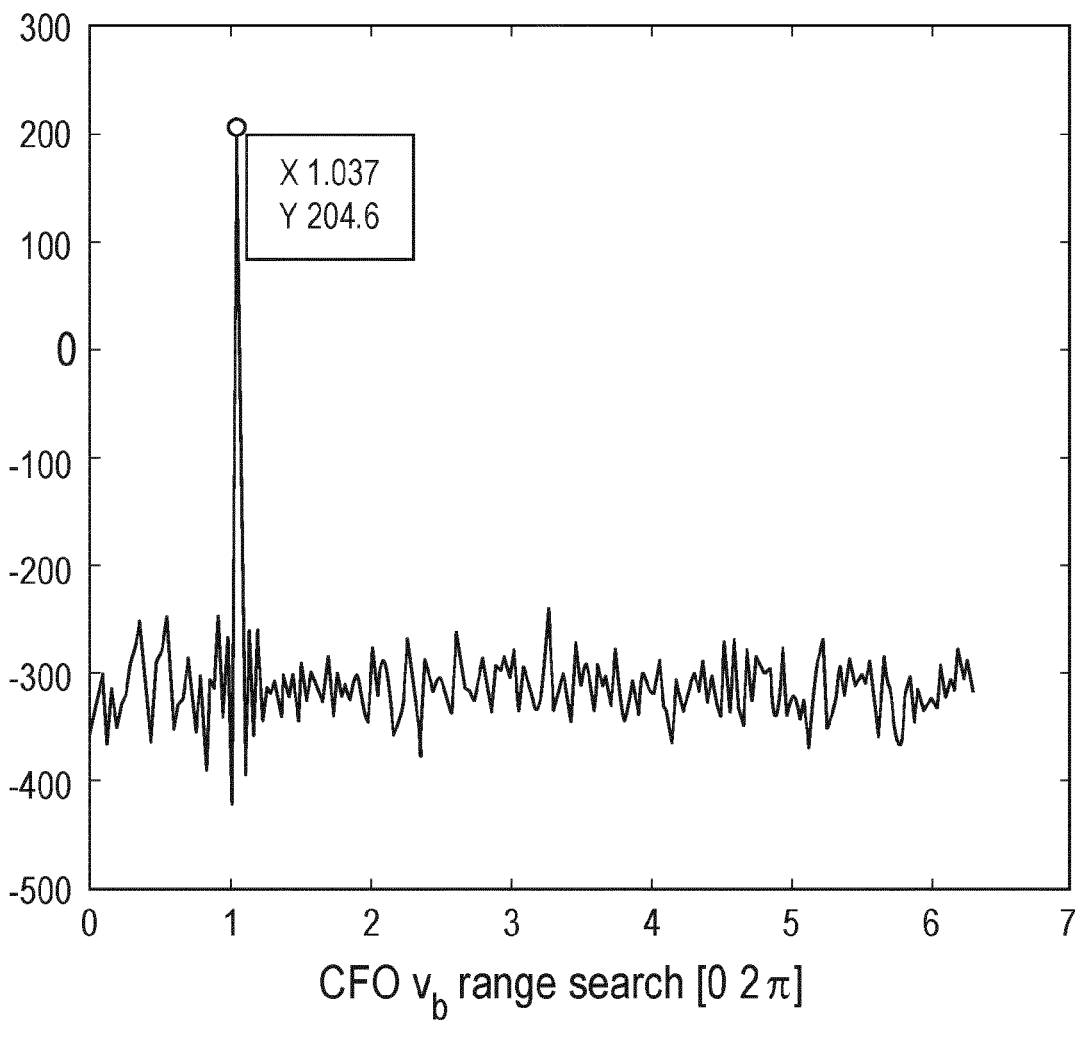

FIGS. 6 and 7 are plots, indicated generally by the reference numerals 70 and 80 respectively, showing simulations in accordance with example embodiments.

The plots 70 and 80 show the n-CFO estimation at one of the bands b, for two different SNR levels, i.e. −5 dB (left) and 5 dB (right), by using the function derived above in Equation (14.a). Here, we attempt at finding the maximum of the function on a grid with resolution $$\frac{2\pi}{200}.$$

To that end, we generate the signal $z_b$ using a value of $$v_b = \frac{\pi}{3} =$$
$$1.0472$$

and two different SNR regimes. We observe that for both regimes the estimator is able to approximate well the true n-CFO, in both cases the estimated value deviating by 0.9740% from the true value.

Figure 8:
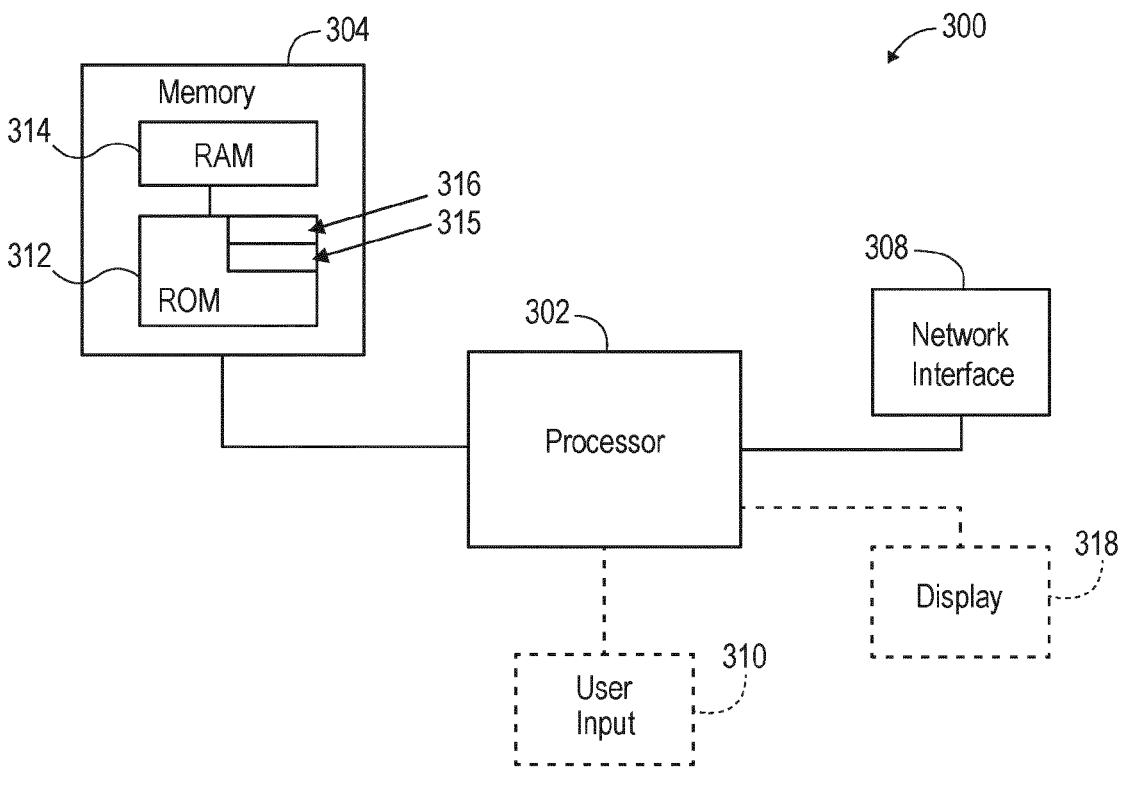
FIG. 8 is a block diagram of components of a system in accordance with an example embodiment.

For completeness, FIG. 8 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a random access memory (RAM) 314 and a read only memory (ROM) 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 40, 50 and 60 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 9:
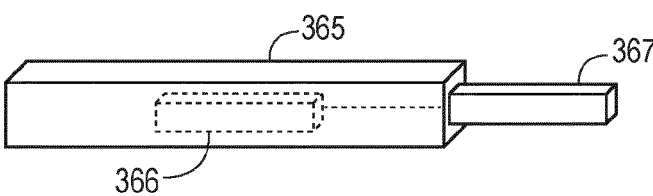
FIG. 9 shows an example of tangible media for storing computer-readable code which when run by a computer may perform methods according to example embodiments described above.

FIG. 9 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3, 4 and 5 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory configured to store instructions that when executed by the at least one processor, cause the apparatus at least to:
obtain aggregated reference signals received from multiple signal carriers over channels of a mobile communication system, wherein the multiple signal carriers have different carrier frequencies;

initialize a first matrix, a channel power matrix and a noise estimate, wherein the first matrix models how a carrier frequency offset (CFO) of a channel of the channels rotates a reference signal phase;
sequentially update:
a channel impulse response (CIR) estimate, the channel power matrix and the noise estimate;
a second matrix, wherein the second matrix describes how reference signals transmitted over the channel are spread and delayed due to multipath propagation;
a vector of channel frequency offset; and
the first matrix; and
repeat the sequential update until a termination condition is reached.

2. The apparatus of claim 1, wherein the apparatus is further caused to generate a position estimate based on at least one of the CIR estimate and the CFO.

3. The apparatus of claim 1, wherein the apparatus is caused to sequentially update the CIR estimate based on a theory that the CIR estimate is sparse or has a constant delay profile across carriers.

4. The apparatus of claim 1, wherein the second matrix is updated based, at least in part, on the updated CIR estimate.

5. The apparatus of claim 1, wherein the vector of channel frequency offset is updated based, at least in part, on power and noise estimates, and on the updated second matrix.

6. The apparatus of claim 1, wherein the first matrix is updated based, at least in part, on the updated vector of channel frequency offset.

7. The apparatus of claim 1, wherein the updated first matrix is utilized in updating of the CIR estimate on a next iteration of the sequential update.

8. The apparatus of claim 1, wherein the aggregated reference signals are caused the apparatus to receive the reference signals transmitted on carriers over the channel of the mobile communication system, and aggregate the received reference signals.

9. The apparatus of claim 1, wherein the multiple signal carriers comprise intra-band carriers.

10. The apparatus of claim 1, wherein the multiple signal carriers comprise inter-band carriers.

11. The apparatus of claim 10, wherein the apparatus is caused to update the CFO based on a theory that the CFO estimates across carriers are independent.

12. The apparatus of claim 1, wherein the multiple signal carriers have contiguous frequencies.

13. The apparatus of claim 1, wherein the reference signals comprise position reference signals, sounding reference signals, or synchronization signals.

14. A method comprising:
obtaining aggregated reference signals received from multiple signal carriers over channels of a mobile communication system, wherein the multiple signal carriers have different carrier frequencies;
initializing a first matrix, a channel power matrix and a noise estimate, wherein the first matrix models how a carrier frequency offset (CFO) of a channel of the channels rotates a reference signal phase;
sequentially updating:
a channel impulse response (CIR) estimate, the channel power matrix and the noise estimate;
a second matrix, wherein the second matrix describes how reference signals transmitted over the channel are spread and delayed due to multipath propagation;
a vector of channel frequency offset; and
the first matrix; and
repeating the sequential updating until a termination condition is reached.

15. The method of claim 14, further comprising:
    generating a position estimate based on at least one of the
       CIR estimate and the CFO.

16. The method of claim 14, wherein the sequentially
updating the CIR estimate is based on a theory that the CIR
estimate is sparse or has a constant delay profile across
carriers.

17. The method of claim 14, wherein the second matrix is
updated based, at least in part, on the updated CIR estimate.

18. The method of claim 14, wherein the vector of channel
frequency offset is updated based, at least in part, on power
and noise estimates, and on the updated second matrix.

19. The method of claim 14, wherein the first matrix is
updated based, at least in part, on the updated vector of
channel frequency offset.

20. The method of claim 14, wherein the updated first
matrix is utilized in updating of the CIR estimate on a next
iteration of the sequential updating.

* * * * *